H. THUN.
SURFACE MEASURING APPARATUS.
APPLICATION FILED FEB. 9, 1921.

1,426,426. Patented Aug. 22, 1922.

Inventor
Hermann Thun
By Knight Bros
Attys

UNITED STATES PATENT OFFICE.

HERMANN THUN, OF ESSEN, GERMANY, ASSIGNOR TO FRIED. KRUPP AKTIENGESELL-SCHAFT, OF ESSEN-ON-THE-RUHR, GERMANY.

SURFACE-MEASURING APPARATUS.

1,426,426.   Specification of Letters Patent.   Patented Aug. 22, 1922.

Application filed February 9, 1921. Serial No. 443,694.

*To all whom it may concern:*

Be it known that I, HERMANN THUN, residing at Essen, Germany, a citizen of the German Republic, have invented a certain new and useful Improvement in Surface-Measuring Apparatus, of which the following is a specification.

The present invention relates to a particularly simple surface measuring apparatus in which holes or recesses are formed in a straight line and at equal distances in which recesses a guide bar is adapted to engage in succession with projections.

The invention will be described with reference to the accompanying drawing in which—

Figure 1:
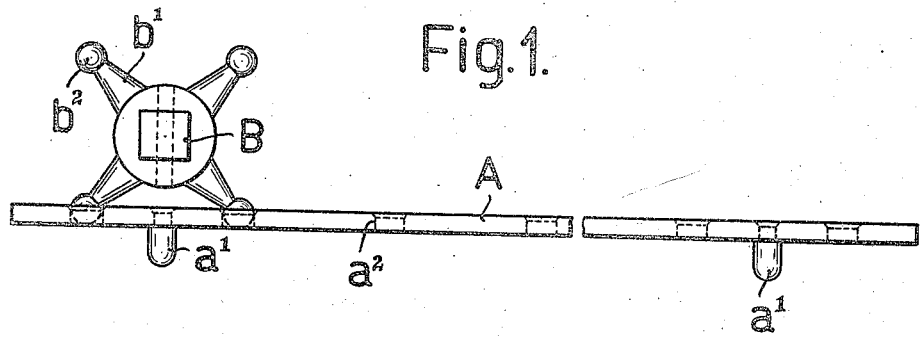
Figure 1 is a side elevation of the apparatus.
Figure 2:
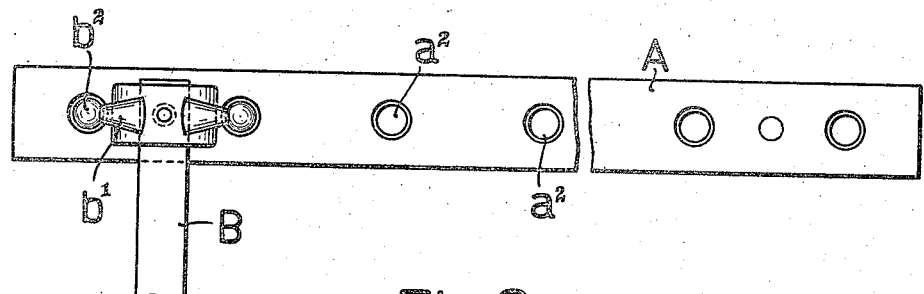
Figure 2 is a plan view corresponding to Figure 1.
Figure 2:
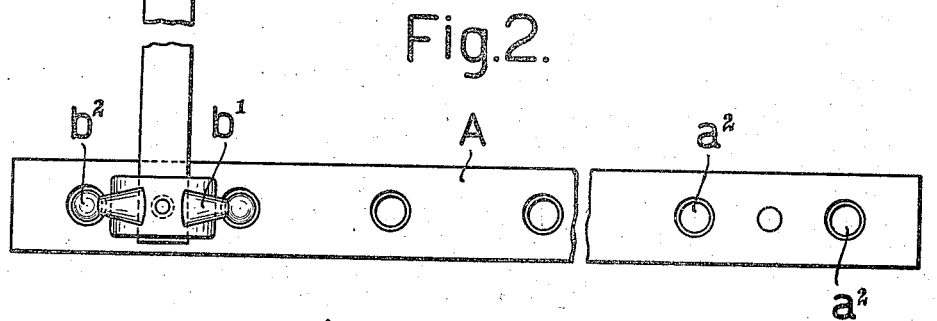

The surface measuring apparatus shown in the drawing consists of two bars A and a guide bar B. The bars A are secured parallel with each other by means of studs $a^1$ which engage in corresponding recesses in a fixed foundation. In the bars A are formed holes $a^2$ at equal distances apart, the distances which the said holes $a^2$ are from each other corresponding to the widths of the strips into which the surface to be measured is to be divided up. The guide bar B carries on each of its ends a cruciform member $b^1$ which is rigidly connected thereto and has limbs of equal length provided with spherically shaped extremities $b^2$ the diameter of which corresponds to the diameter of the holes $a^2$ and the distance of which from each other being equal to the distance apart of the holes $a^2$ from each other.

Figure 3:
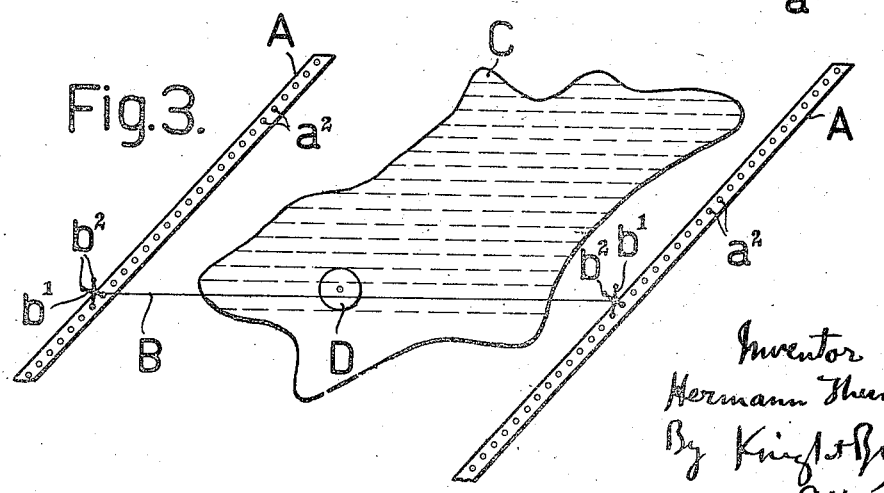
Figure 3 shows diagrammatically a plan view of the apparatus together with an object, the surface of which is to be measured.

When the above described apparatus is to be used the object to be measured, e. g. a piece of leather C, is laid between the bars A in the manner shown in Figure 3. The guide bar B is then placed upon the bars A in such a way that two of the spherical points $b^2$ enter two adjacent and oppositely situated holes $a^2$ and that the guide bar B lies beyond the outermost point of the piece of leather C. The width of the piece of leather C at this point is now measured, which operation may be conveniently done by a measuring wheel D which is run along the guide bar B. After this measurement has been carried out the guide bar B is rolled along on the bars A as far as the distance apart of two holes $a^2$ and the width of the piece of leather again measured. This is repeated until the guide bar B has been rolled along the whole of the piece of leather C. The several widths of the piece of leather determined by measurement are then added up, and the total obtained multiplied by the distance between two of the holes $a^2$. The result gives the desired area of the piece of leather.

Claims.

1. In a surface measuring machine, a plurality of parallel track bars, having distancing formations along said bars and a displaceable transversely arranged rod member cooperating with said bars, said rod member having a plurality of star shaped revoluble pedimental extremities engaging supportably with said distancing formations in a plural mating relationship.

2. In a surface measuring machine, a plurality of parallel track bars, having distancing formations along said bars and a displaceable transversely arranged rod member cooperating with said bars, said rod member having a plurality of pedimental extremities engaging supportably with said distancing formations in a plural mating relationship, said pedimental extremities being spherical in shape, and said distancing formations comprising parts with spherical recesses.

The foregoing specification signed at Essen, Germany, this 4th day of October, 1920.

HERMANN THUN.

In presence of—
HANS GOTTSMANN,
JOHANN DECKERS.